Figure 1:
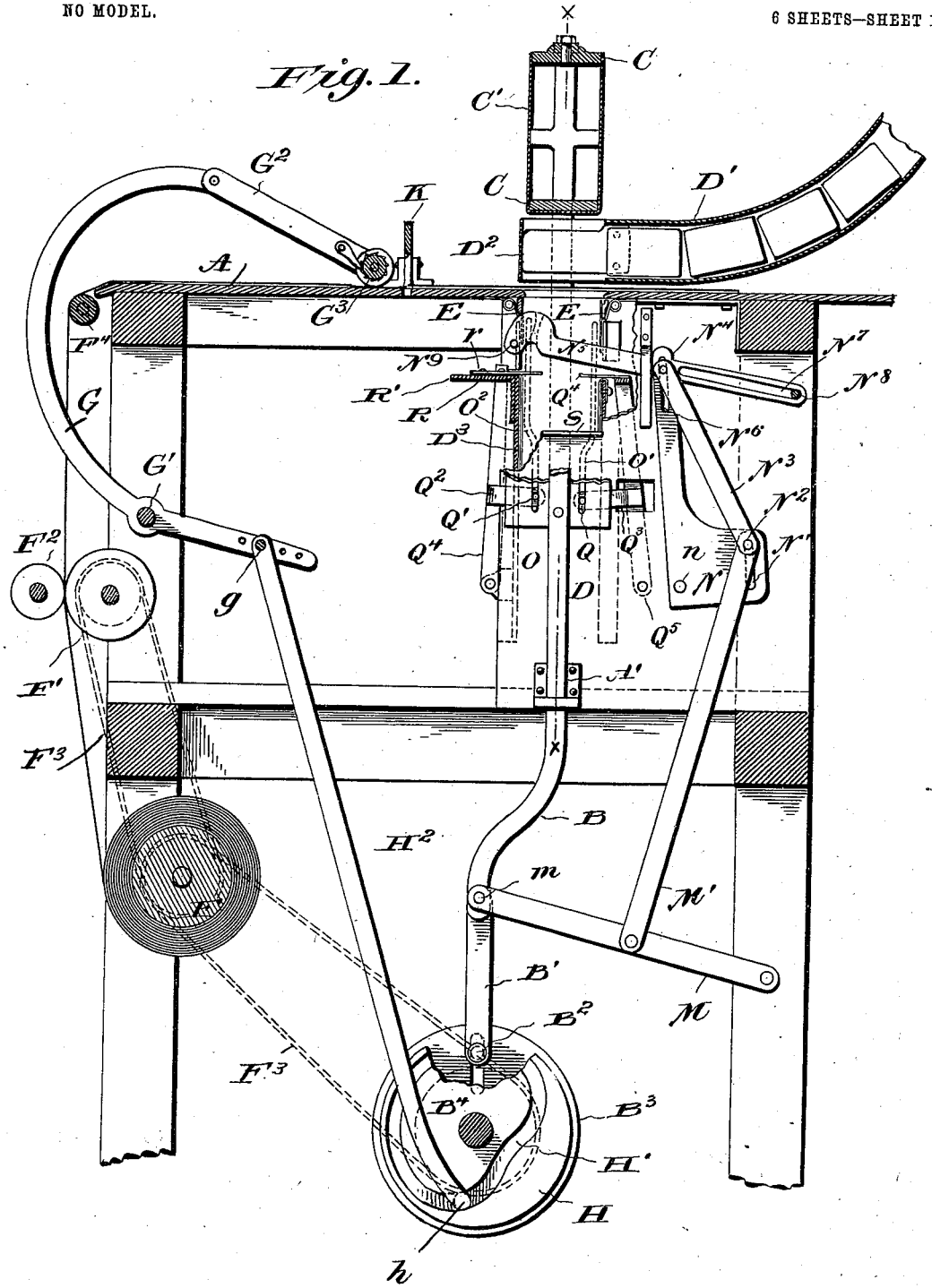

No. 727,927. PATENTED MAY 12, 1903.
J. H. FELMLEE.
WRAPPING MACHINE.
APPLICATION FILED JAN. 6, 1898.
NO MODEL. 6 SHEETS—SHEET 1.

Witnesses:
L. C. Hills
A. L. Hough

Inventor:
John H. Felmlee
By Franklin N. Hough
Attorney

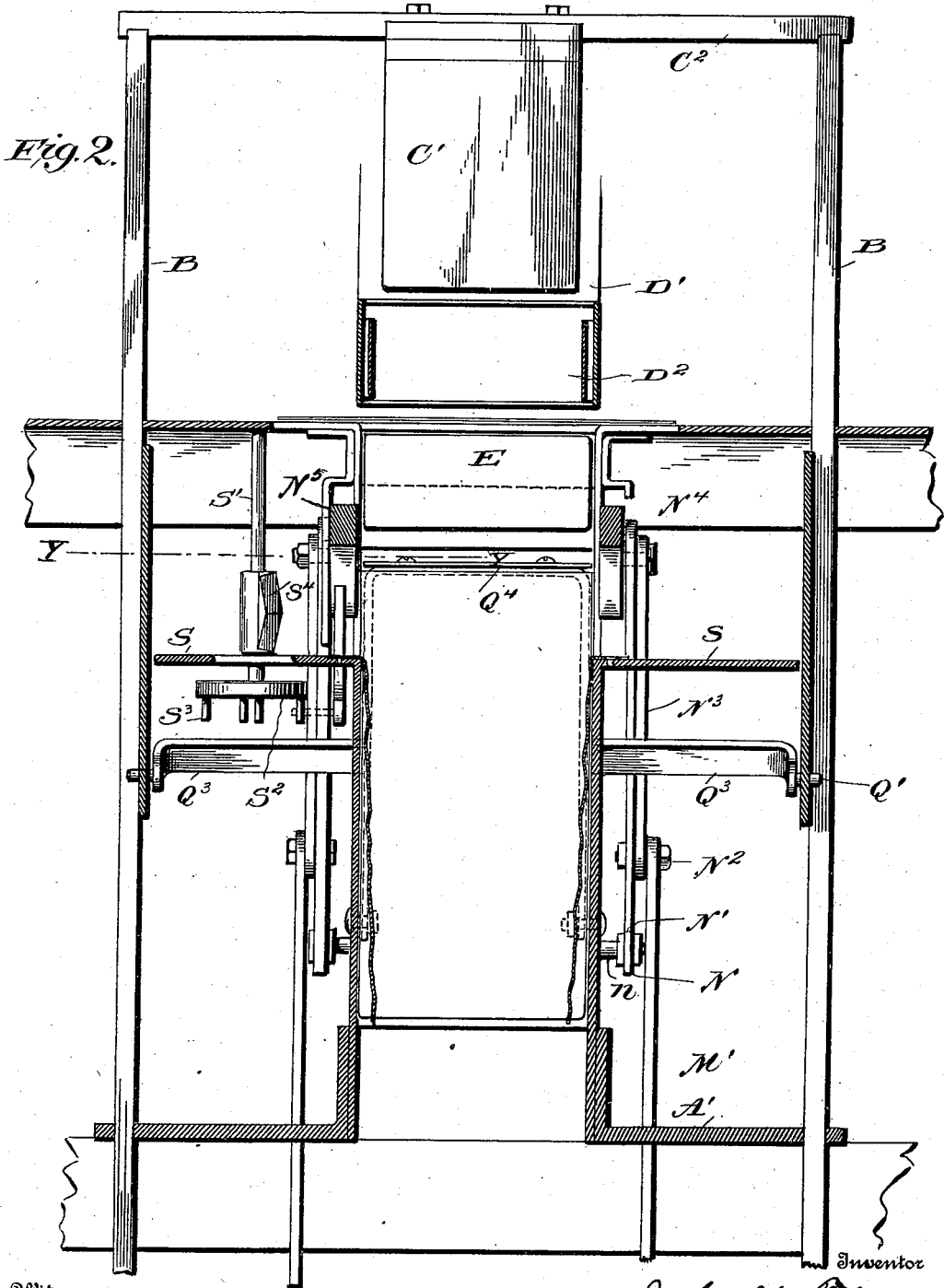

No. 727,927. PATENTED MAY 12, 1903.
J. H. FELMLEE.
WRAPPING MACHINE.
APPLICATION FILED JAN. 6, 1898.
NO MODEL. 6 SHEETS—SHEET 3.
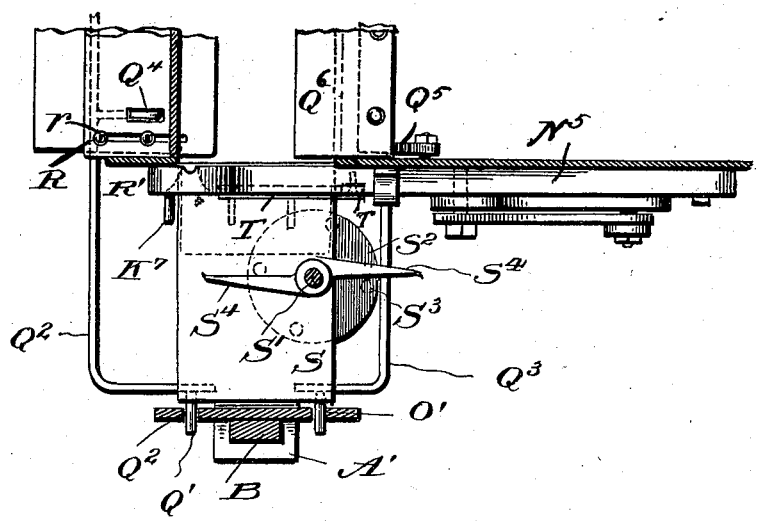
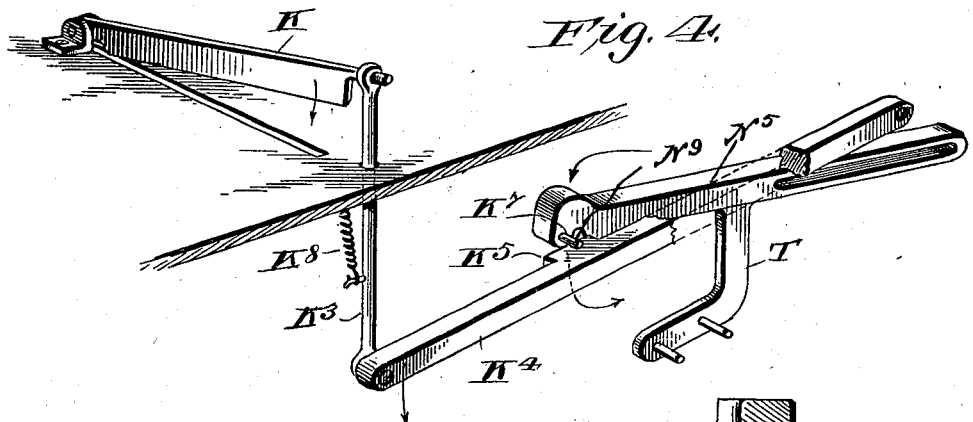

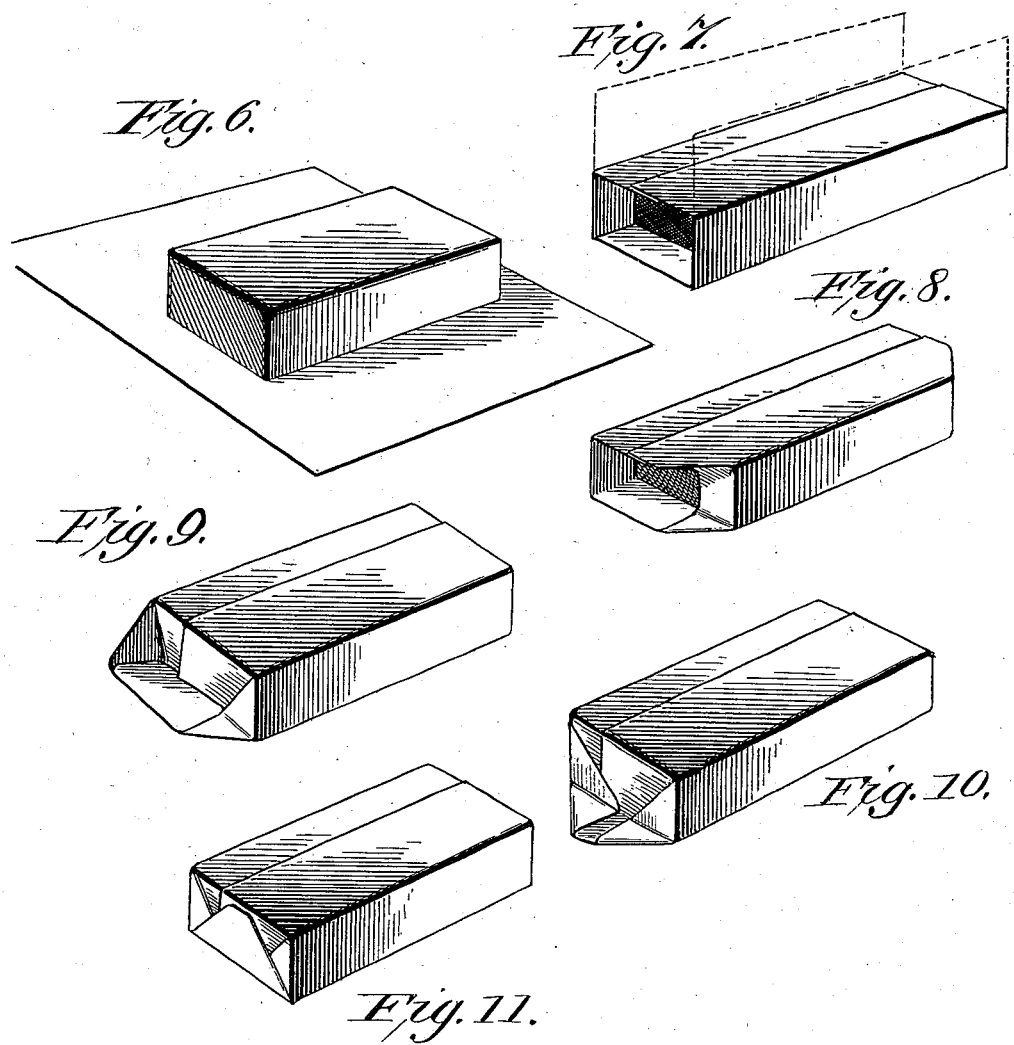

No. 727,927. PATENTED MAY 12, 1903.
J. H. FELMLEE.
WRAPPING MACHINE.
APPLICATION FILED JAN. 6, 1898.
NO MODEL. 6 SHEETS—SHEET 5.
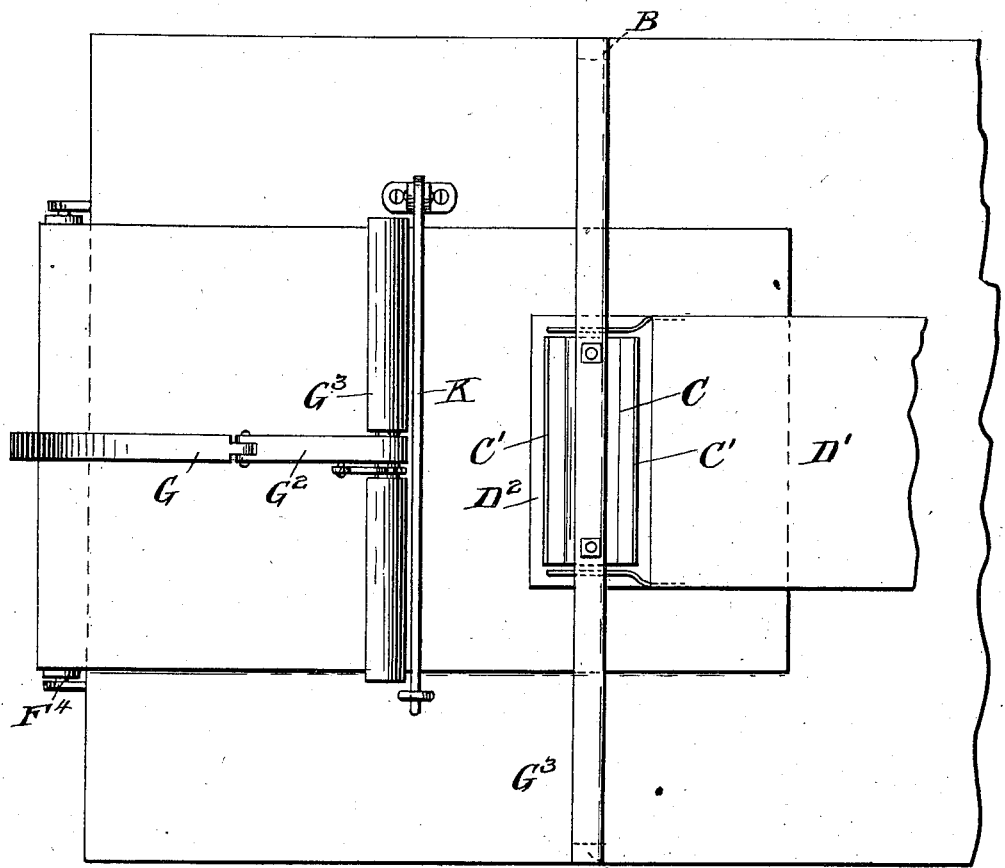
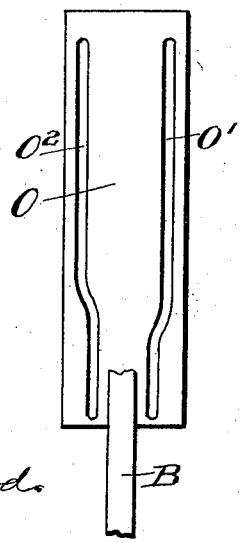

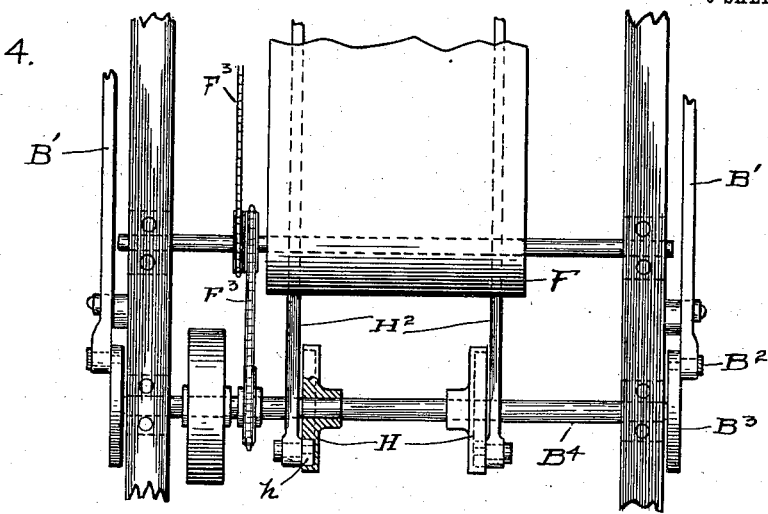
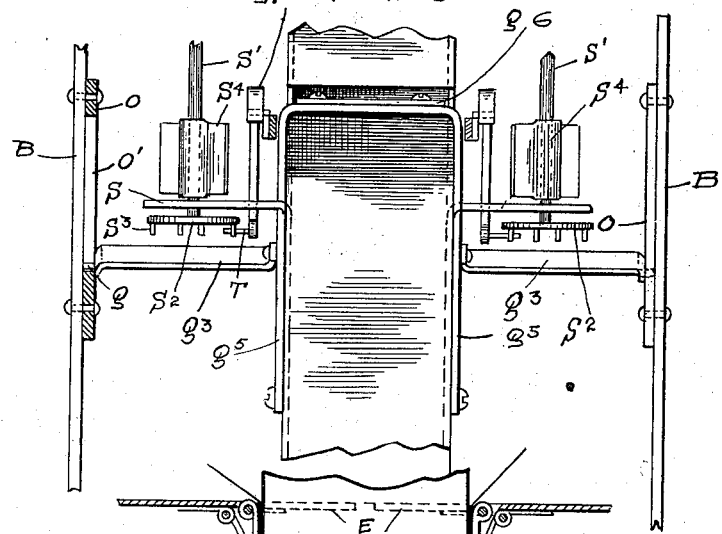
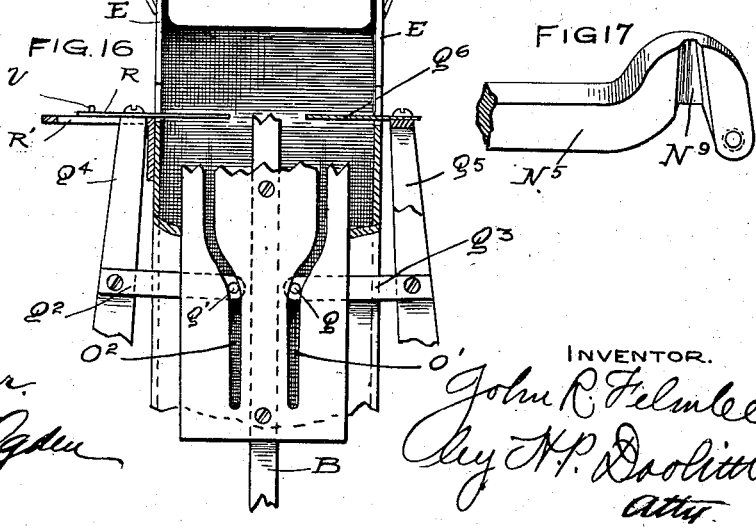
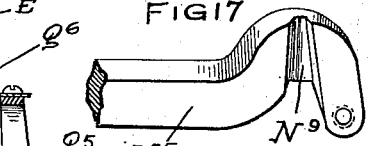

No. 727,927. Patented May 12, 1903.

UNITED STATES PATENT OFFICE.

JOHN H. FELMLEE, OF PITTSBURG, PENNSYLVANIA, ASSIGNOR TO THE EAST END MANUFACTURING COMPANY, OF PITTSBURG, PENNSYLVANIA.

WRAPPING-MACHINE.

SPECIFICATION forming part of Letters Patent No. 727,927, dated May 12, 1903.

Application filed January 6, 1898. Serial No. 665,771. (No model.)

*To all whom it may concern:*

Be it known that I, JOHN H. FELMLEE, a citizen of the United States, residing at Pittsburg, in the county of Allegheny and State of Pennsylvania, have invented certain new and useful Improvements in Wrapping-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to machines for wrapping bars of soap, boxes, and other articles, and my aim is to generally improve upon, simplify, and render more practical the construction of a wrapping-machine for which I have secured Letters Patent of the United States No. 606,919, of July 5, 1898, and in carrying out my invention it is my purpose to provide a machine which will automatically receive the article to be wrapped and eject the same with all of the flaps of the wrapper neatly folded and ready for packing for shipment.

The invention consists in the feeding of the cakes of soap or other articles to be wrapped through a trough or tubing underneath a plunger which forces the cake, underneath which has been previously placed a strip of wrapping-paper, which wrapping-paper has been cut to a suitable size and is forced down in the folding passage-way underneath the cake, after which the side flaps are folded in by mechanism which will be hereinafter more fully described, and illustrated in the drawings forming a part of this application, after which the cake is ejected by means of the following cake, which is forced down in a position to be wrapped, and as the cakes are forced out at the end of the folding-trough they may be conveyed away in any suitable manner to make room for the following wrapped packages.

The invention will be more clearly understood when taken in connection with the accompanying drawings, which, with the letters of reference marked thereon, form a part of this specification, and in which drawings similar letters of reference indicate like parts throughout the several views, in which—

Figure 1 is a vertical sectional view through the machine, showing parts in side elevation. Fig. 2 is a sectional view taken on line X X of Fig. 1 looking in the direction of the arrow. Fig. 3 is a sectional view taken on line Y Y of Fig. 2, the section showing one-half of the machine. Fig. 4 is a detail view showing the manner of actuating the cutting-knife. Fig. 5 is a detail view of the end of one of the members which folds the end flap of the package. Fig. 6 is a view showing the first position of the cake as it sits on the wrapping-paper before being folded. Fig. 7 is a detail view of an article, showing the wrapper with its two upper ends folded over. Fig. 8 is a detail view showing one of the side flaps folded in. Fig. 9 shows all of the flaps folded excepting the last or under one and one side flap. Fig. 10 shows all sides folded except the under one. Fig. 11 shows the article with the wrapping completed; Fig. 12, a plan view of the machine, and Fig. 13 a detail enlarged elevation of one of the cam-plates; Fig. 14, an end view taken at right angles to Fig. 1, particularly showing the main shaft with cams thereon and showing connections with rods B; Fig. 15, a detail view showing folding-box looking from paper-feeding side of the machine; Fig. 16, a detail sectional view of folding-box and coacting parts; and Fig. 17, an enlarged view of the head of lever $N^5$, showing recess $N^9$.

Reference now being had to the details of the drawings by letter, A designates the table or the frame, which is supported on suitable posts. Mounted on the said frame and working vertically through the guide-plates and the apertures in the table are the plunger-actuating rods B. Each of these rods B is pivoted at its lower end to a pitman B', which pitman is in turn pivoted to a wrist-pin $B^2$, which is fastened to the driving-wheel $B^3$, which wheel is keyed to a shaft $B^4$, mounted in the frame of the machine and to which power may be transmitted in any suitable manner. At the other end of the said shaft $B^4$, as particularly shown by Fig. 14, is a similarly-mounted wheel having a wrist-pin and pitman connection between the same and the plunger-operating rod on the opposite side of the machine. The upper ends of the said plunger-rods B are secured to the cross-piece $C^2$, which is bolted or otherwise fastened to the plunger-frame C, which has secured to its opposite sides the plates $C'$. This plunger is mounted directly over a passage-way D in the frame of the machine, and into which passage-way the plunger-head is adapted to work in forcing the article to be wrapped into a proper position in which the flaps may be wrapped about the same. The articles to be wrapped are fed through the pipe or trough $D'$, which is preferably curved in the shape shown in Fig. 1 of the drawings and has its outlet adjacent to the upper end of the passage-way D. The articles to be wrapped fall by gravity by the weight of the superimposed cakes and are delivered into a box $D^2$, with open ends, which is located directly underneath the lower end of the plunger. This box, if preferred, may have spring-flaps secured to its inner faces, adapted to hold the cake from falling out of the said box until the plunger is operated to force it down through into the passage-way in which it is to receive the wrapper.

Hinged to the inner walls of the passage-way near its upper end are the hinged flaps E, one on either side of the passage-way, and which are normally disposed in a horizontal position, as particularly shown in dotted lines in Fig. 16, and adapted to close over the upper end of the said passage-way D, but which will yield to allow the cake of soap to enter and pass into the passage-way when the plunger is operated.

The wrapping-paper, which is wound about the drum F, mounted on a suitable shaft on the frame of the machine, is fed between the rollers $F'$ and $F^2$, where at each revolution of the said rollers the label may be printed upon the paper previous to its being fed forward in a position to receive the package about which it is to be wrapped. This drum F, carrying the paper, is driven by means of a sprocket-chain $F^3$ passing about a sprocket-wheel on the driving-shaft $B^4$ and is constantly unwinding when the machine is in operation. In order to feed the paper forward on the top of the table and underneath the upper open end of the passage-way, through which the article is forced to be wrapped, the following mechanism is employed, consisting of the curved arm G, which is pivoted at $G'$ to one of the posts of the machine, which has pivoted to its upper end the lever $G^2$, which lever has journaled at its end the rubber roller $G^3$, adapted to rest on the upper surface of the sheet of paper. This roller has a ratchet allowing the same to turn in one direction only, and that in the backward movement of the lever $G^2$, the said rubber roller being adapted to be held rigid when it is forcing by friction the wrapping-paper which it is desired to feed forward to the position underneath the plunger. The wrapping-paper which has been unwound from the drum F after being printed between the rollers $F'$ and $F^2$ passes over the pulley $F^4$ at the edge of the table, and as the drum F and the rollers $F'$ and $F^2$, which are connected by sprocket-chains, are constantly in rotation while the machine is in operation, and as there is an intermittent motion imparted to the said curved arm G it will be noted that there will be an accumulation of the slack paper at a location between the rollers $F^2$ and $F^4$, which slack will be taken up on the forward movement of the lever $G^2$, which friction rubber engages with the paper and forces it toward the plunger. In operating the curved arm G, I provide the following mechanism, consisting of a cam-wheel H, which has therein the groove $H'$, in which is mounted the pin $h$, carried at the lower end of the lever $H^2$, which lever is pivoted at its upper end to the lower end of the curved arm G, as at $g$. This cam-wheel may be separated, if preferred, from the wheel $B^3$ or it may be made a part thereof, as may be desired, it being necessary to have the two wheels rotate in unison. The groove $H'$ in the said wheel H is so positioned that in the revolution of the wheel the paper will be fed forward at the moment that the plunger is at its highest throw, and the said lever $G^2$ will be stationary while the plunger is being operated.

In order to cut the strips of paper to a suitable size before being fed into the folding passage-way, a knife K is provided, which is pivoted to the table at one end, its other end secured to a rod $K^3$, which in turn is pivoted to the lever $K^4$, which latter is pivoted to the frame. This lever $K^4$ has an extension $K^5$ on one side on which a pin $K^7$ on the lever $N^5$ strikes as the said lever $N^5$ moves downward and backward, and when it reaches the margin of the said extension passes by free, allowing the knife under tension of a spring $K^8$ to return to its starting position.

Pivoted to one of the posts of the frame is a lever M, the other end of which is pivoted to the plunger-operating rod B at $m$. Pivoted near the longitudinal center of the said lever M is a second lever $M'$, and pivoted to the frame of the machine at $n$ is the plate N. This plate N has an elongated slot near its lower broadened end, as shown at $N'$, and in this slot is mounted the pin $N^2$. Carried at the upper end of the lever $M'$ is a pin, which pivotally connects said lever with a link or connecting-rod $N^3$, which latter carries at its upper end a pin $N^4$, which is pivoted to the lever $N^5$ and works in the elongated slot $N^6$ in the upper contracted end of the plate N. The said lever $N^5$ has an elongated slot $N^2$ therein, and the outer end of the said lever $N^5$ has a sliding pivotal connection with a pin $N^8$, carried on the frame of the machine. The inner end of the said lever $N^5$ has a beveled notched portion $N^9$, which is shown more clearly in Figs. 5 and 17 of the drawings. There is a similar arrangement of levers M, M', N, N³, and N⁵ on the opposite side of the machine for the purpose of wrapping the two side flaps of the wrapper. Mounted on the plunger-operating rods B are the cam-plates O O, one on each side of the machine, and each of the said plates has the slots O' and O² arranged as shown in Fig. 1 of the drawings, with the bent portions at different locations, as illustrated. These cam-plates are adapted to work vertically with the plunger-operating rods, and mounted in the said slots are the pins Q and Q', which are pivoted, respectively, to the links Q² and Q³. Secured to the said link Q² is the lever Q⁴, which is pivoted at its lower end to the frame of the machine, and its upper end passes through an aperture in the folding-plate R, which is adapted to work horizontally on a bracket R', being guided by pins r. As the said lever Q⁴ is tilted it will be noted that the said folding-plate will be moved back and forward on the said bracket. On the opposite side of the folding passage-way is a yoke Q⁵, pivoted at its lower end to the framework and which has secured near its middle portion the link Q³. To the upper end of the said yoke is secured in a horizontal position one of the folding-plates Q⁶, which works through an aperture in the wall of the said passage-way.

Mounted in the bracket S, formed by a part of the frame of the passage-way, is a stub-shaft S', which carries on its lower end a wheel S², having pins S³ thereon, and to the upper end of the said stub-shaft are pivoted the folding-wings S⁴, which as the said shaft is rotated are adapted to swing out into the passage-way and against one of the side flaps of the wrapper which is held about the article to be wrapped. There are two of these stub-shafts with wheels and folding-wings similarly mounted on each side of the wrapping passageway and mounted adjacent to the end flaps, as shown by Fig. 15. Mounted on the lever N⁵ under its under side is the L-shaped member T, which as the said lever is moved inward in the operation of the machine strikes against the said pins S³ and causes a half-revolution of the said wheel and also a half-revolution to the folding-wings S, thus bringing the angled end of one of the said wings against the side flap and folding it against the article which is being wrapped.

As the plunger is forced downward, carrying with it the rods B, secured thereto, and cam-plates O O, it will be noted that as the pins which travel in the slots of the said cams come in contact with the curved portions in the said slots the folding-plates R and Q⁶ will be drawn back out of the path of the advancing cake, which is being depressed with the piece of wrapping-paper underneath the same in the folding passage-way, and the said folding-plates will be held out of the passage-way until the plunger reaches its lowest limit and starts to return to its starting position. In the upward movement of the plunger, which carries with it the said cams O O, the pin Q will cause the plate Q⁶ to be forced into the passage-way slightly in advance of the inward movement of the plate R by reason of the said pin Q striking against the shoulder in its slot before the pin Q' strikes a similar shoulder in the slot O², thus causing the two longitudinal flaps to be folded over the article. In the forward movement of the lever N⁵ the angled lever connected thereto will cause one of the folding-wings S⁴ to swing in against the edge flap at the end of the passage and fold the same, and when the said lever N⁵ has reached its farthest throw inward, by reason of the peculiar movement which is imparted thereto, the upper flaps of the end will be folded down against the end of the article, while the notched end of the said lever will engage over the third or edge flap, and as the said lever is being drawn backward to its starting position and downward slightly the said flap will be folded against the end of the article, and the article has all of its flaps, excepting its lower ones, folded. The said under flaps are folded by means of the following article coming against the upper edge of the partially-folded article, forcing the said partially-folded article farther downward in the folding passage-way. The said spring-flaps within the passage-way hold the folded ends tightly against the article until they are finally ejected at the lower end of the passage-way.

Having thus described my invention, what I claim to be new, and desire to secure by Letters Patent, is—

1. In a wrapping-machine, a passage-way, a plunger, rods connecting the plunger with means for actuating the rods, cam-plates secured to said rods, and horizontally-disposed folding-blades actuated by said cams, substantially as set forth.

2. In a wrapping-machine, the table, the passage-way therein, the plunger, the rods supporting the same and guided in apertures in the frame of the machine, the cam-plates secured to said rods, levers pivoted to the casing of the said passage-way, link connections between the said levers and cam-plates, the folding-blades actuated by the said levers, and means for operating the plunger, combined as set forth.

3. In a wrapping-machine, the framework, the wrapping passage-way therein, the plunger working in said passage-way, driving-wheel and connections between same and the plunger, the cam-plates secured to the plunger-supports, each cam-plate having an angled slot therein, the levers pivoted to the casing of the wrapping passage-way, the link connections between said levers and the slotted cam-plates, the horizontally-mounted folding-blades actuated by said levers, combined as set forth.

4. In a wrapping-machine, the table, the wrapping passage-way, the operating-wheel, the pitman and rod connections between the wheel and plunger, the cam-plates secured to the rods supporting the plunger, the lever and yoke pivotedly supported on opposite sides of the passage-way, the links connecting the lever and yoke with the cam-plates, and the folding-blades operated by the lever and yoke, combined as set forth.

5. In a wrapping-machine, the combination, with the framework, of a wrapping passage-way, a plunger, an operating-wheel, supporting-rods for the plunger, a pitman connection between the operating-wheel and the supporting-rods, cam-plates secured to the rods, a lever and yoke on opposite sides of the passage-way, links connecting said cam-plates and the lever and yoke, and folding blades or plates actuated by the lever and yoke and adapted to pass through openings in the sides of the passage-way, substantially as set forth.

6. In a wrapping-machine, the combination of the table, the wrapping passage-way, the plunger mounted therein, and means for operating the same, the rotary edge-folding wings, mounted horizontally, the wings of which are adapted to swing into the wrapping passage-way, the stub-shaft carrying said wrapping-wings, the wheel keyed to said shaft, pins on said wheel, and a longitudinally-operating lever carrying a pin which is adapted to rotate said wheel carrying the pins, as shown and described.

7. In a wrapping-machine, the combination with the table, the wrapping passage-way, the plunger and means for operating the same, the rotary edge-folding wings, of the notched folding-lever pivoted slidingly to a post of the machine, means for operating the same, and a pin on said lever designed to rotate the folding-wings, as set forth.

8. In a wrapping-machine, the combination, with the frame, of a wrapping passage-way, a plunger operating therein, supporting-rods for the plunger, cam-plates secured to the supporting-rods, means for actuating the rods and the plunger, folding-blades operating within the passage-way, means connected with the supporting-rods and with the cam-plates for operating the folding blades or members, and means for feeding wrapping material under the material to be wrapped, substantially as set forth.

9. In combination with a wrapping-machine, a paper-cutting knife pivoted to the table, the lever pivoted at one end to a post of the machine, a rod connecting its other end with the end of the knife, a lug on the side of said lever, and the edge-folding lever having a pin adapted to contact against the said lug and depress the knife, as the said folding-lever is operated, as set forth.

In testimony whereof I affix my signature in presence of two witnesses.

JOHN H. FELMLEE.

Witnesses:
PRESLEY P. MURPHY,
JOHN LENHART.